(12) United States Patent
Wiegman

(10) Patent No.: US 11,634,232 B1
(45) Date of Patent: Apr. 25, 2023

(54) HYBRID PROPULSION SYSTEMS FOR AN ELECTRIC AIRCRAFT

(71) Applicant: BETA AIR, LLC, South Burlington, VT (US)

(72) Inventor: Herman Wiegman, South Burlington, VT (US)

(73) Assignee: BETA AIR, LLC, South Burlington, VT (US)

(*) Notice: Subject to any disclaimer, the term of this patent is extended or adjusted under 35 U.S.C. 154(b) by 0 days.

(21) Appl. No.: 17/734,014

(22) Filed: Apr. 30, 2022

(51) Int. Cl.
*B64D 27/24* (2006.01)
*B64C 29/00* (2006.01)
*B64D 41/00* (2006.01)
*B64D 27/02* (2006.01)

(52) U.S. Cl.
CPC .......... *B64D 27/24* (2013.01); *B64C 29/0025* (2013.01); *B64D 2027/026* (2013.01); *B64D 2041/002* (2013.01)

(58) Field of Classification Search
CPC .............. B64D 27/24; B64D 2027/026; B64D 2041/002; B64C 29/0025
See application file for complete search history.

(56) References Cited

U.S. PATENT DOCUMENTS

| 2 | A | * | 7/1836 | Goulding | D01G 21/00 |
| | | | | | 57/58.49 |
| 3,155,071 | A | * | 11/1964 | Buttner | B63H 11/08 |
| | | | | | 440/43 |
| 3,605,935 | A | * | 9/1971 | Gilbert | B60F 1/00 |
| | | | | | 296/35.3 |
| 5,613,653 | A | * | 3/1997 | Bombled | B64G 1/641 |
| | | | | | 244/173.1 |
| 5,890,441 | A | * | 4/1999 | Swinson | B64C 29/0025 |
| | | | | | 244/12.3 |
| 6,138,951 | A | * | 10/2000 | Budris | B64G 1/645 |
| | | | | | 102/393 |

(Continued)

FOREIGN PATENT DOCUMENTS

| RU | 2542805 C1 | 2/2015 |
| TR | 2542805 C1 | 2/2015 |
| WO | 2019211875 | 11/2019 |

OTHER PUBLICATIONS

Dean Sigler, Regenerative Gas Turbines for Hybrid Aircraft, Aug. 10, 2020.

*Primary Examiner* — Medhat Badawi
(74) *Attorney, Agent, or Firm* — Caldwell Intellectual Property Law

(57) ABSTRACT

A hybrid propulsion system for an electric aircraft, the system including an electric aircraft including a fuselage. The fuselage including an energy source containing electric power. The electric aircraft further including at least a laterally extending element attached to the fuselage and extending laterally from the fuselage. The electric aircraft further including at least a propulsor electrically connected to the energy source. The system also including at least a power unit pod attached to the at least a laterally extending element and including an auxiliary power unit configured to generate electric power. The power unit pod also including a fuel tank in fluid communication with the auxiliary power unit and a power output line electrically connected to the energy source of the electric aircraft.

20 Claims, 9 Drawing Sheets

(56) References Cited

U.S. PATENT DOCUMENTS

| | | | | |
|---|---|---|---|---|
| 7,857,254 B2* | 12/2010 | Parks | | B64C 15/00 244/12.4 |
| 7,950,606 B2* | 5/2011 | Atkey | | B64D 13/06 244/135 R |
| 8,469,306 B2* | 6/2013 | Kuhn, Jr. | | B64C 29/0033 244/12.4 |
| 8,552,575 B2* | 10/2013 | Teets | | G01S 5/0018 290/40 C |
| 9,193,451 B2* | 11/2015 | Salyer | | B64C 37/00 |
| 9,284,058 B2* | 3/2016 | Wang | | B64D 27/24 |
| 9,376,208 B1* | 6/2016 | Gentry | | G05D 1/042 |
| 9,475,579 B2* | 10/2016 | Fredericks | | B64D 27/26 |
| 9,493,235 B2* | 11/2016 | Zhou | | B60F 5/02 |
| 9,751,614 B1* | 9/2017 | Nguyen | | B64C 15/02 |
| 9,776,714 B2 | 10/2017 | Shapery | | |
| 9,834,305 B2 | 12/2017 | Taylor et al. | | |
| 9,932,118 B2* | 4/2018 | Bak | | B64C 29/0025 |
| 10,017,270 B2* | 7/2018 | Becker | | F02C 7/32 |
| 10,189,565 B2* | 1/2019 | Patterson | | B64C 29/0033 |
| 10,252,810 B2* | 4/2019 | Niergarth | | F01D 25/24 |
| 10,351,235 B2* | 7/2019 | Karem | | B64C 13/18 |
| 10,597,152 B2* | 3/2020 | Groninga | | B64C 39/008 |
| 10,604,266 B2* | 3/2020 | Roever | | B64D 27/16 |
| 10,661,896 B2* | 5/2020 | Ozaki | | B64C 39/02 |
| 10,676,205 B2* | 6/2020 | Niergarth | | B64D 27/24 |
| 10,762,726 B2* | 9/2020 | Gansler | | B64D 35/08 |
| 10,793,281 B2* | 10/2020 | Vondrell | | B64D 27/24 |
| 10,906,656 B2* | 2/2021 | Gilliland | | B64C 27/28 |
| 10,926,874 B2* | 2/2021 | Giannini | | B64C 3/385 |
| 11,149,578 B2* | 10/2021 | Joshi | | F02C 6/14 |
| 11,312,486 B2* | 4/2022 | Regev | | B64D 35/02 |
| 11,365,001 B1* | 6/2022 | Woodall | | B64C 29/0033 |
| 11,407,529 B1* | 8/2022 | Barnes | | B64C 15/02 |
| 11,435,762 B1* | 9/2022 | Auerbach | | B64D 27/24 |
| 11,437,662 B1* | 9/2022 | Wiegman | | H01M 10/486 |
| 11,440,427 B1* | 9/2022 | Wiegman | | B64F 1/362 |
| 11,440,678 B1* | 9/2022 | Wiegman | | B64D 45/04 |
| 11,443,569 B1* | 9/2022 | Churchill | | G05B 13/0265 |
| 11,444,464 B1* | 9/2022 | Ford | | G05B 15/02 |
| 11,447,015 B1* | 9/2022 | Wiegman | | B64D 27/24 |
| 11,447,030 B1* | 9/2022 | Palombini | | B60L 53/65 |
| 11,447,035 B1* | 9/2022 | Hull | | B60L 53/65 |
| 11,447,244 B1* | 9/2022 | Griffin | | B64D 43/02 |
| 11,449,078 B1* | 9/2022 | Freiheit | | G05D 1/1062 |
| 11,453,488 B2* | 9/2022 | Klemen | | B64D 27/10 |
| 11,453,489 B2* | 9/2022 | Tian | | B64C 29/0025 |
| 11,453,490 B2* | 9/2022 | Bevirt | | B64D 27/24 |
| 11,453,508 B2* | 9/2022 | Dubreuil | | F16H 57/0475 |
| 11,454,990 B1* | 9/2022 | List | | B64C 29/00 |
| 11,456,472 B2* | 9/2022 | Tichy | | H01M 8/04164 |
| 11,456,511 B2* | 9/2022 | Demont | | B60L 50/64 |
| 11,456,693 B2* | 9/2022 | Berry | | H02K 11/33 |
| 2003/0085319 A1* | 5/2003 | Wagner | | B64C 27/20 244/12.3 |
| 2008/0136257 A1* | 6/2008 | Flanigan | | H02P 9/307 307/10.1 |
| 2011/0168416 A1* | 7/2011 | Frasure | | A62C 37/04 169/61 |
| 2012/0128493 A1* | 5/2012 | Shelley | | F02C 7/32 416/146 R |
| 2016/0229532 A1* | 8/2016 | Shapery | | B64C 29/0075 |
| 2017/0327219 A1* | 11/2017 | Alber | | B64C 29/02 |
| 2018/0065739 A1* | 3/2018 | Vondrell | | B64D 27/24 |
| 2018/0215462 A1* | 8/2018 | Fenny | | B64C 11/28 |
| 2018/0229606 A1* | 8/2018 | Vondrell | | B60L 50/10 |
| 2018/0251226 A1* | 9/2018 | Fenny | | B64D 27/24 |
| 2018/0290771 A1* | 10/2018 | Chiang | | B64G 1/645 |
| 2018/0291807 A1* | 10/2018 | Dalal | | F02K 5/00 |
| 2018/0304753 A1* | 10/2018 | Vondrell | | B64C 21/06 |
| 2018/0354632 A1* | 12/2018 | Hon | | F02C 6/00 |
| 2018/0372003 A1* | 12/2018 | Hon | | F01D 25/36 |
| 2019/0375495 A1* | 12/2019 | Pfammatter | | B64C 27/28 |
| 2020/0272141 A1* | 8/2020 | Chung | | G05D 1/102 |
| 2020/0277066 A1* | 9/2020 | Becker | | B64D 31/12 |
| 2020/0290742 A1* | 9/2020 | Kumar | | B64D 27/10 |
| 2020/0298036 A1* | 9/2020 | Partridge | | B64D 45/00 |
| 2020/0407060 A1* | 12/2020 | Hosseini | | G05D 1/101 |
| 2021/0098143 A1* | 4/2021 | Trojer | | G21C 5/10 |
| 2021/0214094 A1* | 7/2021 | Harwood | | B64D 27/24 |
| 2021/0269152 A1 | 9/2021 | Wankewycz et al. | | |
| 2021/0284329 A1* | 9/2021 | Bernard | | B64C 25/52 |
| 2022/0055762 A1* | 2/2022 | Clarke | | H01M 8/04029 |
| 2022/0056843 A1* | 2/2022 | Burkett | | H02K 7/20 |
| 2022/0094297 A1* | 3/2022 | Lacaux | | B64C 11/303 |
| 2022/0135240 A1* | 5/2022 | Imel | | B64D 31/06 60/716 |
| 2022/0169366 A1* | 6/2022 | Truong | | B64C 29/0025 |
| 2022/0177109 A1* | 6/2022 | Hefner | | B64C 1/068 |
| 2022/0213842 A1* | 7/2022 | Mercier-Calvairac | | F02K 5/00 |
| 2022/0250762 A1* | 8/2022 | Sperrin | | F17C 11/005 |
| 2022/0255316 A1* | 8/2022 | Perkinson | | B64D 31/14 |
| 2022/0258645 A1* | 8/2022 | Bower | | B60L 3/0046 |
| 2022/0281593 A1* | 9/2022 | Stobbe | | B64C 3/32 |
| 2022/0281597 A1* | 9/2022 | Tian | | B64C 29/0025 |
| 2022/0285753 A1* | 9/2022 | Rainville | | B64C 27/32 |
| 2022/0286019 A1* | 9/2022 | Vive | | H02K 21/28 |
| 2022/0289376 A1* | 9/2022 | Hayakawa | | B64D 27/24 |
| 2022/0289379 A1* | 9/2022 | Morrison | | H04L 12/40 |
| 2022/0289400 A1* | 9/2022 | Kim | | G05D 1/0858 |
| 2022/0290576 A1* | 9/2022 | Ota | | B64D 27/10 |
| 2022/0291683 A1* | 9/2022 | Bacic | | G08G 5/0091 |
| 2022/0292987 A1* | 9/2022 | Bacic | | B64D 27/24 |
| 2022/0292991 A1* | 9/2022 | Bacic | | B60L 58/12 |
| 2022/0297822 A1* | 9/2022 | Ol | | B64C 13/20 |
| 2022/0297827 A1* | 9/2022 | Colaciti | | B64C 11/001 |
| 2022/0297844 A1* | 9/2022 | Mackin | | B64D 27/24 |
| 2022/0297846 A1* | 9/2022 | Mark | | B64D 35/08 |
| 2022/0297848 A1* | 9/2022 | Sivalingam | | B64D 27/02 |
| 2022/0298925 A1* | 9/2022 | Tamada | | F01D 15/10 |
| 2022/0298968 A1* | 9/2022 | Forsdike | | F02C 7/32 |
| 2022/0299569 A1* | 9/2022 | Kurtz | | B64D 43/00 |
| 2022/0302477 A1* | 9/2022 | Landolt | | B64D 27/24 |
| 2022/0302801 A1* | 9/2022 | Osama | | B64D 33/00 |
| 2022/0302843 A1* | 9/2022 | Marxgut | | H02M 7/4837 |

* cited by examiner

HYBRID PROPULSION SYSTEMS FOR AN ELECTRIC AIRCRAFT

FIELD OF THE INVENTION

The present invention generally relates to the field of hybrid aircraft propulsion. In particular, the present invention is directed to hybrid propulsion systems for an electric aircraft.

BACKGROUND

Electric aircraft hold great promise as the future of commercial and recreational flight. Electric aircraft may be able to lessen our dependence on fossil fuel and help decrease greenhouse gas emissions. However, the batteries on which electric aircraft rely have a lower energy density than conventional fuel. This leads to range limitations. Existing solutions to this problem are not sufficient.

SUMMARY OF THE DISCLOSURE

In an aspect, a hybrid propulsion system for an electric aircraft, the system including an electric aircraft, the electric aircraft including a fuselage, the fuselage including an energy source, wherein the energy source contains electric power. The electric aircraft further including at least a laterally extending element, wherein the at least a laterally extending element is attached to the fuselage and the at least a laterally extending element extends laterally from the fuselage. The electric aircraft further including at least a propulsor, wherein the at least a propulsor is electrically connected to the energy source. The system also including at least a power unit pod, wherein the at least a power unit pod is attached to the at least a laterally extending element, the at least a power unit pod including an auxiliary power unit, the auxiliary power unit configured to generate electric power, a fuel tank, wherein the fuel tank is in fluid communication with the auxiliary power unit, and a power output line, the power output line electrically connected to the energy source of the electric aircraft.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure are directed to systems for hybrid propulsion of an electric aircraft. Aspects of the present disclosure include a attached power unit pod. In certain aspects, power unit pod may be removably attached In certain aspects, the power unit pod may be attached to an electric aircraft to provide hybrid power to the electric aircraft.

Aspects of the present disclosure include a power unit pod including a fuel tank and APU. In certain aspects, the APU may be configured to generate electric power. In certain aspects, the APU may be electrically connected to at least a propulsor, so that the generated electric power can be sent to the at least a propulsor. In this way, the electric power generated by the APU may be used to supplement the energy in the energy source on board electric aircraft in order to extend the range of electric aircraft.

Figure 1:
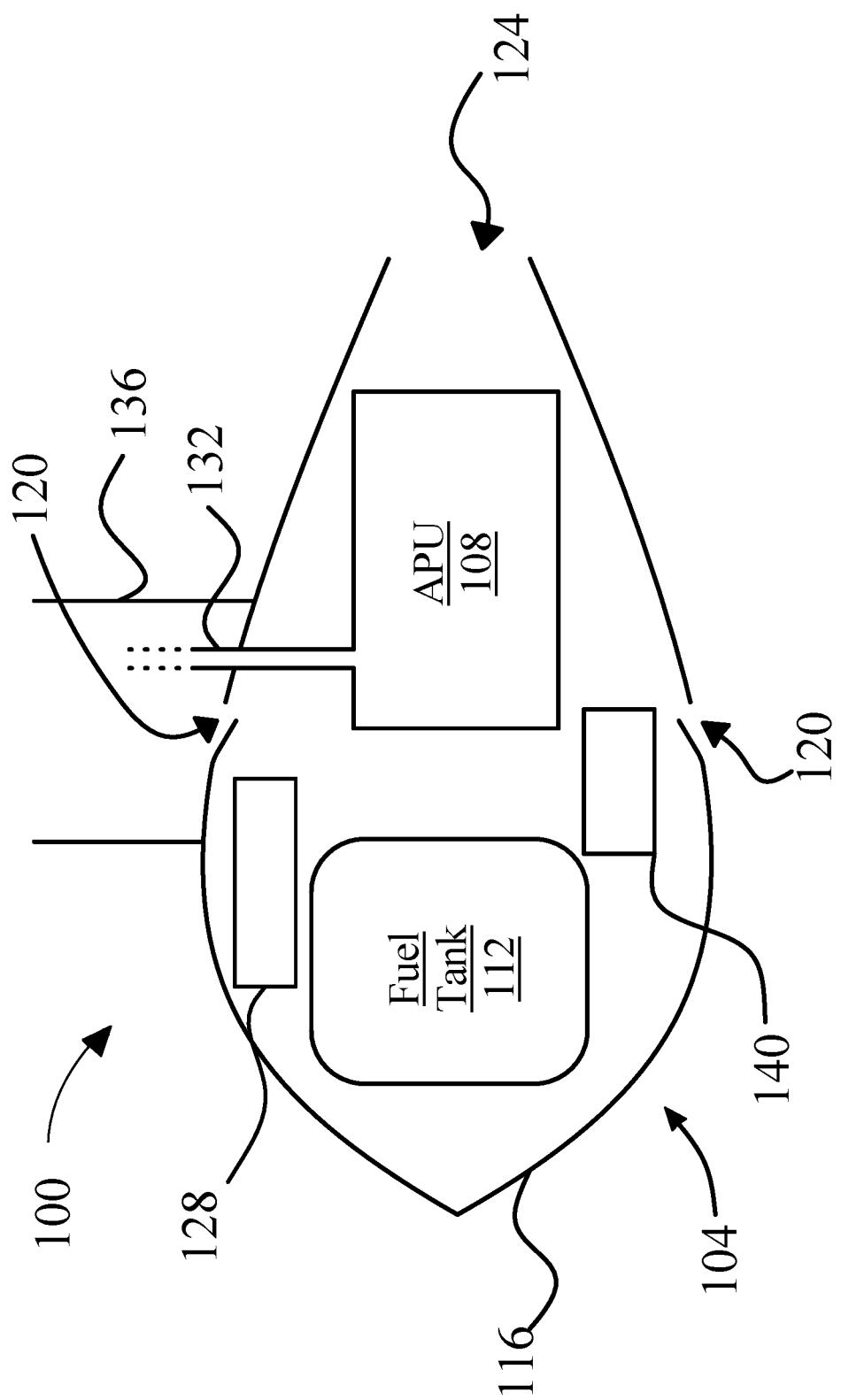
FIG. 1 is a depiction of an exemplary power unit pod system.

Referring now to FIG. 1, a power unit pod system 100 is depicted. Power unit pod system 100 includes a power unit pod 104. For the purposes of this disclosure, a "power unit pod" is an enclosed body, separate from the fuselage of the aircraft, containing an auxiliary power unit. With continued reference to FIG. 1, power unit pod 104 includes an auxiliary power unit 108 (APU 108). An "auxiliary power unit," for the purposes of this disclosure, is an aircraft engine that does not produce thrust. The APU 108 is configured to generate electric power. An APU 108 may be said to be configured to generate electric power, if the APU 108 drives an electric generator. In some embodiments, APU 108 may include an electric generator. An "electric generator," for the purposes of this disclosure, is a device that converts motive power to electric power. As a non-limiting example, in some embodiments, APU 108 may include a turbine engine. As a non-limiting example, in some embodiments, APU 108 may include a reciprocating engine. As a non-limiting example, in some embodiments, APU 108 may include a fuel cell engine. As a non-limiting example, in some embodiments, APU 108 may include a fuel reformer. In some embodiments, the APU 108 may have a power rating of over 100 kW. In some embodiments, the APU 108 may have a power rating of 150-200 kW. In some embodiments, the APU 108 may have a power rating of less than 100 kW. A person of ordinary skill in the art would recognize, after having reviewed the entirety of this disclosure, that APU 108 may have a wide range of power ratings, depending on the power demands required by the specific application.

With continued reference to FIG. 1, power unit pod 104 includes a fuel tank 112. For the purposes of this disclosure, a "fuel tank" is a container designed to hold fuel. In some embodiments, fuel tank 112 may contain a fuel. As a non-limiting example, fuel tank 112 may contain aviation fuel. As a non-limiting example, aviation fuel may include jet fuel such as Jet A-1 and Jet B. As a non-limiting example, aviation fuel may include unleaded kerosene or naphtha-kerosene. As a non-limiting example, aviation fuel may include gasoline suitable for the aviation context. In some embodiments, fuel tank 112 may contain gasoline. In some embodiments, fuel tank 112 may include diesel. In some embodiments, fuel tank 112 may contain hydrogen gas. A person of ordinary skill in the art, after having reviewed the entirety of this disclosure, would understand that the fuel contained in fuel tank 112 must be compatible with APU 108 in order to ensure operability. Fuel tank 112 is in fluid communication with APU 108. For the purposes of this disclosure being in "fluid communication" means that fluid is able to flow from one of the fluidly connected elements to the other, notwithstanding any elements that temporarily or optionally restrict fluid flow, such as, as non-limiting examples, a check valve or a pressure disk. In some embodiments, fuel tank 112 may include a fuel line. The fuel line may be in fluid communication with APU 108. The fuel line may be a hose, tube, conduit, and the like. In some embodiments, fuel tank 112 may include a fuel pump. The fuel pump may transfer fuel from fuel tank 112 to APU 108. In some embodiments, fuel tank 112 may include a fuel valve. A "valve," for the purposes of this disclosure, is a device for restricting or otherwise controlling the flow of a liquid, gas, or fluid. In some embodiments, fuel valve may control the flow of fuel between fuel tank 112 and APU 108. In some embodiments, fuel valve may include a gate valve. In some embodiments, fuel valve may include a solenoid-operated valve. In some embodiments, fuel valve may include a spray valve.

With continued reference to FIG. 1, in some embodiments, power unit pod 104 may be contained within a nacelle 116. A "nacelle" for the purposes of this disclosure, is an aerodynamically streamlined body, that is streamlined according to what it contains. As a nonlimiting example, wherein nacelle 116 contains APU 108 and fuel tank 112, nacelle 116 may be streamlined to fit around these contents, while remaining aerodynamic. As a non-limiting example, nacelle 116 may have a tear drop shape. In some embodiments, nacelle 116 may be shaped (or streamlined) to reduce drag, when the airplane that it is attached to is in edgewise flight. In some embodiments, nacelle 116 may be shaped so as to ensure beneficial aerodynamic interaction with the other components of the aircraft, such as the wings, engines, fuselage, and the like. As a non-limiting example, nacelle 116 may be shaped so as to not disturb airflow over the wings of an aircraft.

With continued reference to FIG. 1, nacelle may include one or more inlet 120. Inlet 120 may provide an opening into the interior of nacelle 116 through which air may flow. In some embodiments, inlet 120 may be designed to provide airflow to APU 108. As a non-limiting example this airflow may be used to cool APU 108. Inlet 120 may have a variety of profile shapes. As a non-limiting example, the profile shape inlet 120 may be rectangular. In some embodiments, the profile shape of inlet 120 may be tear drop shaped. For the purposes of this disclosure, the "profile shape" of inlet 120 is the shape of the opening formed by inlet 120 in nacelle 116 as projected onto a 2D surface. In some embodiments, where there is more than one inlet 120, inlet 120 may be spaced around the circumference of nacelle 116 at regular intervals. In some embodiments, inlet 120 may be annular. In some embodiments, inlet 120 may be a low drag air inlet. As a non-limiting example, inlet 120 may include a NACA duct.

With continued reference to FIG. 1, nacelle may include an outlet 124. Outlet 124 may allow air to pass out of nacelle 116. Outlet 124 may be in fluid connection with an exhaust of APU 108. In some embodiments, outlet 124 may have a circular profile shape. In some embodiments, outlet 124 may have a rectangular profile shape. In some embodiments, outlet 124 may have an irregular shape. For the purposes of this disclosure, the "profile shape" of outlet 124 is the shape of the opening formed by outlet 124 in nacelle 116 as projected onto a 2D surface.

With continued reference to FIG. 1, in some embodiments, system 100 may include a local controller 128. Local controller 128 may be communicatively connected to APU 108 and/or fuel tank 112. In some embodiments, local controller 128 may be communicatively connected to various components on board the aircraft. In some embodiments, local controller 128 may be communicatively connected to a controller on board the aircraft, such as a flight controller. "Communicatively connected," for the purpose of this disclosure, means connected such that data can be transmitted, whether wirelessly or wired. In some embodiments, local controller 128 may send control signals to APU 108 to operate APU 108. In some embodiments, local controller 128 may send control signals to components of fuel tank 112. As a non-limiting example, local controller 128 may send a control signal to the fuel pump to turn fuel pump on and/or off.

With continued reference to FIG. 1, local controller 128 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. local controller 128 may include a single computing device operating independently, or may include two or more computing device operating in concert, in parallel, sequentially or the like; two or more computing devices may be included together in a single computing device or in two or more computing devices. local controller 128 may interface or communicate with one or more additional devices as described below in further detail via a network interface device. Network interface device may be utilized for connecting local controller 128 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. local controller 128 may include but is not limited to, for example, a computing device or cluster of computing devices in a first location and a second computing device or cluster of computing devices in a second location. local controller 128 may include one or more computing devices dedicated to data storage, security, distribution of traffic for load balancing, and the like. local controller 128 may distribute one or more computing tasks as described below across a plurality of computing devices of computing device, which may operate in parallel, in series, redundantly, or in any other manner used for distribution of tasks or memory between computing devices. local controller 128 may be implemented using a "shared nothing" architecture in which data is cached at the worker, in an embodiment, this may enable scalability of system 100 and/or computing device.

With continued reference to FIG. 1, local controller 128 may be designed and/or configured to perform any method, method step, or sequence of method steps in any embodiment described in this disclosure, in any order and with any degree of repetition. For instance, local controller 128 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. local controller 128 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 includes a power output line 132. The power output line 132 is electrically connected to an energy source of an electric aircraft when system 100 is attached to an electric aircraft. "Electrically connected," for the purposes of this disclosure, means connected such that electricity may flow between the connected components. In some cases, components may be electrically connected, even when electricity must flow through an intermediary component in between the electrically connected components. As used in this disclosure a "propulsor" is a component and/or device used to propel a craft by exerting force on a fluid medium, which may include a gaseous medium such as air or a liquid medium such as water. Power output line 132 may carry the electric power produced by APU 108 to the energy source of the electric aircraft, thereby charging the energy source. In some embodiments, power unit pod 104 may include a high voltage power line. For the purposes of this disclosure, a "high voltage power line" is a conductor configured to transmit high voltage electricity. High voltage power line may provide components of power unit pod 104 with high voltage power. As a non-limiting example, high voltage power line in may provide APU 108 with high voltage power. As another non-limiting example, high voltage power line may provide high voltage power to components of fuel tank 112, such as, as a non-limiting example, the fuel pump. In some embodiments, system 100 may include a communications line. The communications line may carry signals between components of system 100 and components of electric aircraft 200. In some embodiments, the communications line may communicatively connect local controller 128 with another controller, such as a flight controller on the aircraft.

With continued reference to FIG. 1, in some embodiments, system 100 may include a pod support 136. For the purposes of this disclosure, a "pod support" is a support structure for power unit pod 104 designed to hold power unit pod 104 in place. In some embodiments, power unit pod 104 may be connected to pod support 136. As a non-limiting example, the top of power unit pod 104 may be connected to the bottom of pod support 136. "Top" and "bottom," in this case, are defined with reference to the orientation of the components in FIG. 1. In some embodiments, pod support 136 may be directly connected to power unit pod 104. Pod support 136 may include various interior support structures designed to provide structural rigidity, withstand loading, and support power unit pod 104. In some embodiments, particularly when system 100 does not contain a pod support 136, power unit pod 104 may be directly connected to an aircraft. As a non-limiting example, power unit pod 104 may be directly connected to a laterally extending element of the aircraft. In some embodiments, pod support 136 may have an airfoil cross-section. An "airfoil" as used in this disclosure is a shape designed such that a fluid flowing over it exerts differing levels of pressure against the top and bottom surface. This pressure differential creates lift when the fluid flowing over the lower surface creates a higher pressure than the fluid flowing over the upper surface. An airfoil may have a leading edge and a trailing edge. As used in this disclosure a "leading edge" is a foremost edge of an airfoil that first intersects with the fluid medium. The "trailing edge" is the back end of the airfoil and is the last point on the airfoil that the fluid medium comes in contact with. Airfoils may have a centerline, wherein the centerline is the locus of points halfway between the top and bottom surface of the airfoil. Thus, for a symmetrical airfoil, the centerline is a straight line from the leading edge to the trailing edge. Airfoils may also have a chord line, wherein the chord line is a straight line from the leading edge to the trailing edge. Accordingly, for a symmetric airfoil, the chord line and the centerline are identical. The position of an airfoil may be described using an angle of attack. An angle of attack is the angle between the chord line of the airfoil and the direction of the oncoming flow of the fluid. Many airfoils create lift at an angle of attack of zero; however, symmetric airfoils do not create lift at an angle of attack of zero. Symmetric airfoils create lift when the angle of attack is greater than zero and create downforce when the angle of attack is less than zero. In some embodiments, this airfoil cross section may be symmetrical. In some embodiments, the airfoil cross-section may be chosen to reduce drag. As a non-limiting example, the airfoil cross-section may be chosen from the NACA "00" airfoil family.

With continued reference to FIG. 1, in some embodiments, system 100 may include a power supply 140. For the purposes of this disclosure, a "power supply" is a device that converts electrical power from a source current, voltage, and/or frequency to a load current, voltage, and/or frequency. One of ordinary skill in the art, after having reviewed the entirety of this disclosure, would appreciate that power supply 140 may convert the source power to a variety of different load currents, voltages, and/or frequencies depending on the electrical requirements of the loads electrically connected to power supply 140. In some embodiments, local controller 128 may be electrically connected to power supply 140. In some embodiments, fuel tank 112, and any components thereof, may be electrically connected to power supply 140. In some embodiments, APU 108 may provide the source power for power supply 140. In some embodiments, power supply 140 may output low voltage as a load voltage. In some embodiments, power supply 140 may output 28V as the load voltage.

Figure 2:
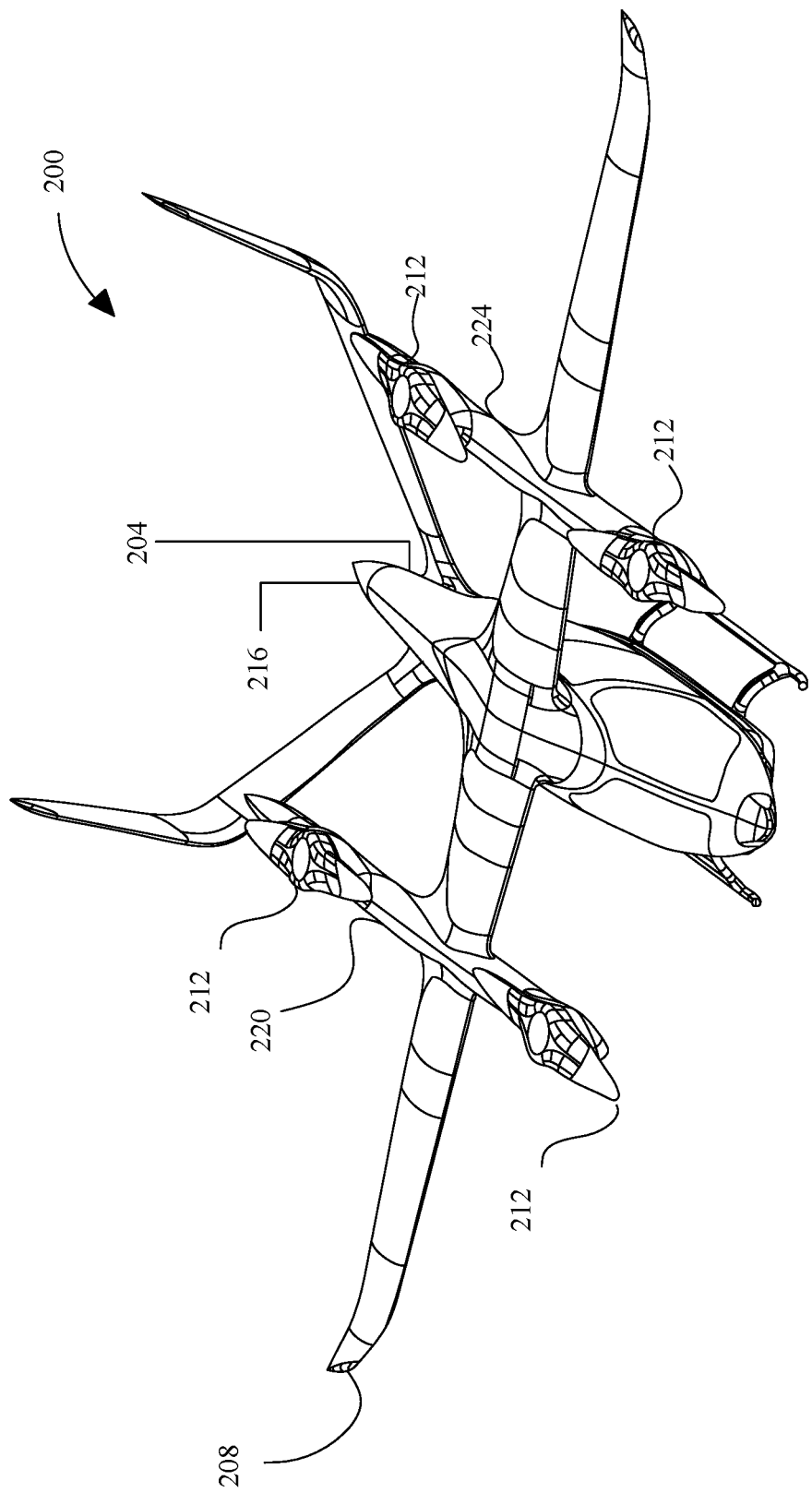
FIG. 2 is an illustration of an exemplary electric aircraft.

Referring now to FIG. 2, an exemplary embodiment of an electric aircraft 200 is illustrated. Electric aircraft 200 may include an electrically powered aircraft. In some embodiments, electrically powered aircraft may be an electric vertical takeoff and landing (eVTOL) aircraft. Electric aircraft 200 may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

In an embodiment, and still referring to FIG. 2, electric aircraft 200 may include a fuselage 204. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 204 may comprise structural elements that physically support the shape and structure of an aircraft. Structural elements may take a plurality of forms, alone or in combination with other types. Structural elements may vary depending on the construction type of aircraft and specifically, the fuselage. Fuselage 204 may comprise a truss structure. A truss structure is often used with a lightweight aircraft and includes welded steel tube trusses. A truss, as used herein, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later in this paper.

In embodiments, fuselage 204 may comprise geodesic construction. Geodesic structural elements may include stringers wound about formers (which may be alternatively called station frames) in opposing spiral directions. A stringer, as used herein, is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along the length of the interior of fuselage 204 orthogonal to the longitudinal (nose to tail) axis of the aircraft and forms the general shape of fuselage 204. A former may comprise differing cross-sectional shapes at differing locations along fuselage 204, as the former is the structural element that informs the overall shape of a fuselage 204 curvature. In embodiments, aircraft skin can be anchored to formers and strings such that the outer mold line of the volume encapsulated by the formers and stringers includes the same shape as electric aircraft when installed. In other words, former(s) may form a fuselage's ribs, and the stringers may form the interstitials between such ribs. The spiral orientation of stringers about formers provides uniform robustness at any point on an aircraft fuselage such that if a portion sustains damage, another portion may remain largely unaffected. Aircraft skin would be mechanically coupled to underlying stringers and formers and may interact with a fluid, such as air, to generate lift and perform maneuvers.

In an embodiment, and still referring to FIG. 2, fuselage 204 may comprise monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

Still referring to FIG. 2, fuselage 204 may include a semi-monocoque construction. Semi-monocoque construction, as used herein, is a partial monocoque construction, wherein a monocoque construction is describe above detail. In semi-monocoque construction, fuselage 204 may derive some structural support from stressed aircraft skin and some structural support from underlying frame structure made of structural elements. Formers or station frames can be seen running transverse to the long axis of fuselage 204 with circular cutouts which are generally used in real-world manufacturing for weight savings and for the routing of electrical harnesses and other modern on-board systems. In a semi-monocoque construction, stringers are the thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate that there are numerous methods for mechanical fastening of the aforementioned components like crews, nails, dowels, pins, anchors, adhesives like glue or epoxy, or bolts and nuts, to name a few. A subset of fuselage under the umbrella of semi-monocoque construction is unibody vehicles. Unibody, which is short for "unitized body" or alternatively "unitary construction", vehicles are characterized by a construction in which the body, floor plan, and chassis form a single structure. In the aircraft world, unibody would comprise the internal structural elements like formers and stringers are constructed in one piece, integral to the aircraft skin as well as any floor construction like a deck.

Still referring to FIG. 2, it should be noted that an illustrative embodiment is presented only, and this disclosure in no way limits the form or construction of electric aircraft. In embodiments, fuselage 204 may be configurable based on the needs of the electric per specific mission or objective. The general arrangement of components, structural elements, and hardware associated with storing and/or moving a payload may be added or removed from fuselage 204 as needed, whether it is stowed manually, automatedly, or removed by personnel altogether. Fuselage 204 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 204 may also be configurable to accept certain specific cargo containers, or a receptable that can, in turn, accept certain cargo containers.

Still referring to FIG. 2, fuselage 204 includes an energy source. An "energy source," for the purposes of this disclosure, is a store of electrical power. An energy source may include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which electric aircraft may be incorporated.

In an embodiment, and still referring to FIG. 2, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 2, energy source may include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. Persons skilled in the art will be aware, after reviewing the entirety of this disclosure, of many different components of an energy source. Exemplary energy sources are disclosed in detail in U.S. patent application Ser. Nos. 16/948,157 and 16/948,140 both entitled "SYSTEM AND METHOD FOR HIGH ENERGY DENSITY BATTERY MODULE" by S. Donovan et al., which are incorporated in their entirety herein by reference.

Still referring to FIG. 2, electric aircraft includes at least a laterally extending element 208, wherein the at least a laterally extending element is attached to fuselage 204. As used in this disclosure a "laterally extending element" is an element that projects essentially horizontally from fuselage, including an outrigger, a spar, and/or a fixed wing that extends from fuselage. Laterally extending element 208 projects laterally from fuselage 204. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section may geometry includes an airfoil. Wing may include a leading edge. For example, and without limitation, leading edge may include one or more edges that may comprise one or more characteristics such as sweep, radius and/or stagnation point, droop, thermal effects, and the like thereof. In an embodiment, and without limitation, wing may include a trailing edge. In an embodiment, and without limitation, trailing edge may include an edge capable of controlling the direction of the departing medium from the wing, such that a controlling force is exerted on the aircraft. Laterally extending element 208 may comprise differing and/or similar cross-sectional geometries over its cord length or the length from wing tip to where wing meets the aircraft's body. One or more wings may be symmetrical about the aircraft's longitudinal plane, which includes the longitudinal or roll axis reaching down the center of the aircraft through the nose and empennage, and the plane's yaw axis. Laterally extending element 208 may comprise controls surfaces configured to be commanded by a pilot or pilots to change a wing's geometry and therefore its interaction with a fluid medium, like air. Control surfaces may comprise flaps, ailerons, tabs, spoilers, slats, and the like.

Still referring to FIG. 2, electric aircraft may include at least a propulsor, such as lift propulsors 212 and pusher propulsor 216. The at least a propulsor is electrically connected to the energy source. Thus, at least a propulsor may receive power from APU 108. In an embodiment, when a propulsor twists and pulls air behind it, it will, at the same time, push an aircraft forward with an equal amount of force. As a further non-limiting example, the propulsor may include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like. The more air pulled behind an aircraft, the greater the force with which the aircraft is pushed forward. may include a plurality of blades. As used in this disclosure a "blade" is a propeller that converts rotary motion from an engine or other energy source into a swirling slipstream. In an embodiment, blade may convert rotary motion to push the propeller forwards or backwards. In an embodiment the propulsors include a rotating power-driven hub, to which are attached several radial airfoil-section blades such that the whole assembly rotates about a longitudinal axis. The blades may be configured at an angle of attack. In an embodiment, and without limitation, angle of attack may include a fixed angle of attack. As used in this disclosure an "fixed angle of attack" is fixed angle between the chord line of the blade and the relative wind. As used in this disclosure a "fixed angle" is an angle that is secured and/or unmovable from the attachment point. For example, and without limitation fixed angle of attack may be 2.8° as a function of a pitch angle of 8.1° and a relative wind angle 5.4°. In another embodiment, and without limitation, angle of attack may include a variable angle of attack. As used in this disclosure a "variable angle of attack" is a variable and/or moveable angle between the chord line of the blade and the relative wind. As used in this disclosure a "variable angle" is an angle that is moveable from the attachment point. For example, and without limitation variable angle of attack may be a first angle of 4.7° as a function of a pitch angle of 7.1° and a relative wind angle 2.4°, wherein the angle adjusts and/or shifts to a second angle of 2.7° as a function of a pitch angle of 5.1° and a relative wind angle 2.4°. In an embodiment, angle of attack be configured to produce a fixed pitch angle. As used in this disclosure a "fixed pitch angle" is a fixed angle between a cord line of a blade and the rotational velocity direction. For example, and without limitation, fixed pitch angle may include 18°. In another embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine the speed of the forward movement as the blade rotates.

With continued reference to FIG. 2, the propulsors may include electric motors. The electric motor may be driven by direct current (DC) electric power and may include, without limitation, brushless DC electric motors, switched reluctance motors, induction motors, or any combination thereof. In some embodiments, the electric motors may be driven using alternating current (AC) electric power. A motor may also include electronic speed controllers or other components for regulating motor speed, rotation direction, and/or dynamic braking. The electric motors may be consistent with any electric motors disclosed in U.S. patent application Ser. No. 16/703,225, filed on Dec. 4, 2019, and titled "AN INTEGRATED ELECTRIC PROPULSION ASSEMBLY" or U.S. patent application Ser. No. 16/938,952, filed on Jul. 25, 2020, and titled "AN INTEGRATED ELECTRIC PROPULSION ASSEMBLY," the entirety of both are hereby incorporated by reference.

In an embodiment, and still referring to FIG. 2, Lift propulsor 212 may be configured to provide lift to electric aircraft 200. As used in this disclosure a "lift" is a perpendicular force to the oncoming flow direction of fluid surrounding the surface. For example, and without limitation relative air speed may be horizontal to electric aircraft, wherein the lift force may be a force exerted in the vertical direction, directing electric aircraft upwards. In some embodiments, the at least a lift propulsor 212 may comprise two lift propulsors. In some embodiments, each of these two lift propulsors may be connected to the laterally extending element 208.

Still referring to FIG. 2, electric aircraft 200 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 2, a number of aerodynamic forces may act upon the electric aircraft during flight. Forces acting on electric aircraft 200 during flight may include, without limitation, thrust, the forward force produced by the rotating element of the electric aircraft and acts parallel to the longitudinal axis. Another force acting upon electric aircraft 200 may be, without limitation, drag, which may be defined as a rearward retarding force which is caused by disruption of airflow by any protruding surface of the electric aircraft 200 such as, without limitation, the wing, rotor, and fuselage. Drag may oppose thrust and acts rearward parallel to the relative wind. A further force acting upon electric aircraft 200 may include, without limitation, weight, which may include a combined load of the electric aircraft 200 itself, crew, baggage, and/or fuel. Weight may pull electric aircraft 200 downward due to the force of gravity. An additional force acting on electric aircraft 200 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 200 are designed to be as lightweight as possible. Reducing the weight of the aircraft and designing to reduce the number of components is essential to optimize the weight. To save energy, it may be useful to reduce weight of components of electric aircraft 200, including without limitation propulsors and/or propulsion assemblies. In an embodiment, motor may eliminate need for many external structural features that otherwise might be needed to join one component to another component. Motor may also increase energy efficiency by enabling a lower physical propulsor profile, reducing drag and/or wind resistance. This may also increase durability by lessening the extent to which drag and/or wind resistance add to forces acting on electric aircraft 200 and/or propulsors.

Still referring to FIG. 2, the at least a propulsor of electric aircraft 200 may include at least a pusher propulsor 216. As used in this disclosure a "pusher propulsor" is a flight component that is mounted such that the component generates forward thrust through the medium. Pusher propulsor 216 may be configured to provide forward thrust to electric aircraft 200. As a non-limiting example pusher propulsor 216 may include a pusher flight component such as a pusher propeller, a pusher motor, a pusher propulsor, and the like. Additionally, or alternatively, pusher flight component may include a plurality of pusher flight components. In some embodiments, the at least a pusher propulsor 216 may be connected to the tail end of the electric aircraft. For the purposes of this disclosure, the "tail end" of an aircraft is the back end of the aircraft, oftentimes close to the aircraft's tail. As depicted in FIG. 2, pusher propulsor 216 is connected to the tail end of electric aircraft 200.

Still referring to FIG. 2, in some embodiments, aircraft 200 may include a first propulsor boom 220. For the purposes of this disclosure, a "propulsor boom" is a support arm configured to support at least a propulsor. In some embodiments, first propulsor boom 220 may extend perpendicularly from laterally extending element 208. First propulsor boom 220 may be connected to the at least a laterally extending element 208. In some embodiments, a first lift propulsor 212 may be connected to the first propulsor boom 220. First lift propulsor, as a non-limiting example, may be either of the lift propulsors 212 connected to first propulsor boom 220.

With continued reference to FIG. 2, in some embodiments, aircraft 200 may include a second propulsor boom 224. In some embodiments, second propulsor boom 224 may extend perpendicularly from laterally extending element 208. second propulsor boom 224 may be connected to the at least a laterally extending element 208. In some embodiments, a second lift propulsor 212 may be connected to the second propulsor boom 224. Second lift propulsor, as a non-limiting example, may be either of the lift propulsors 212 connected to second propulsor boom 224.

Figure 3:
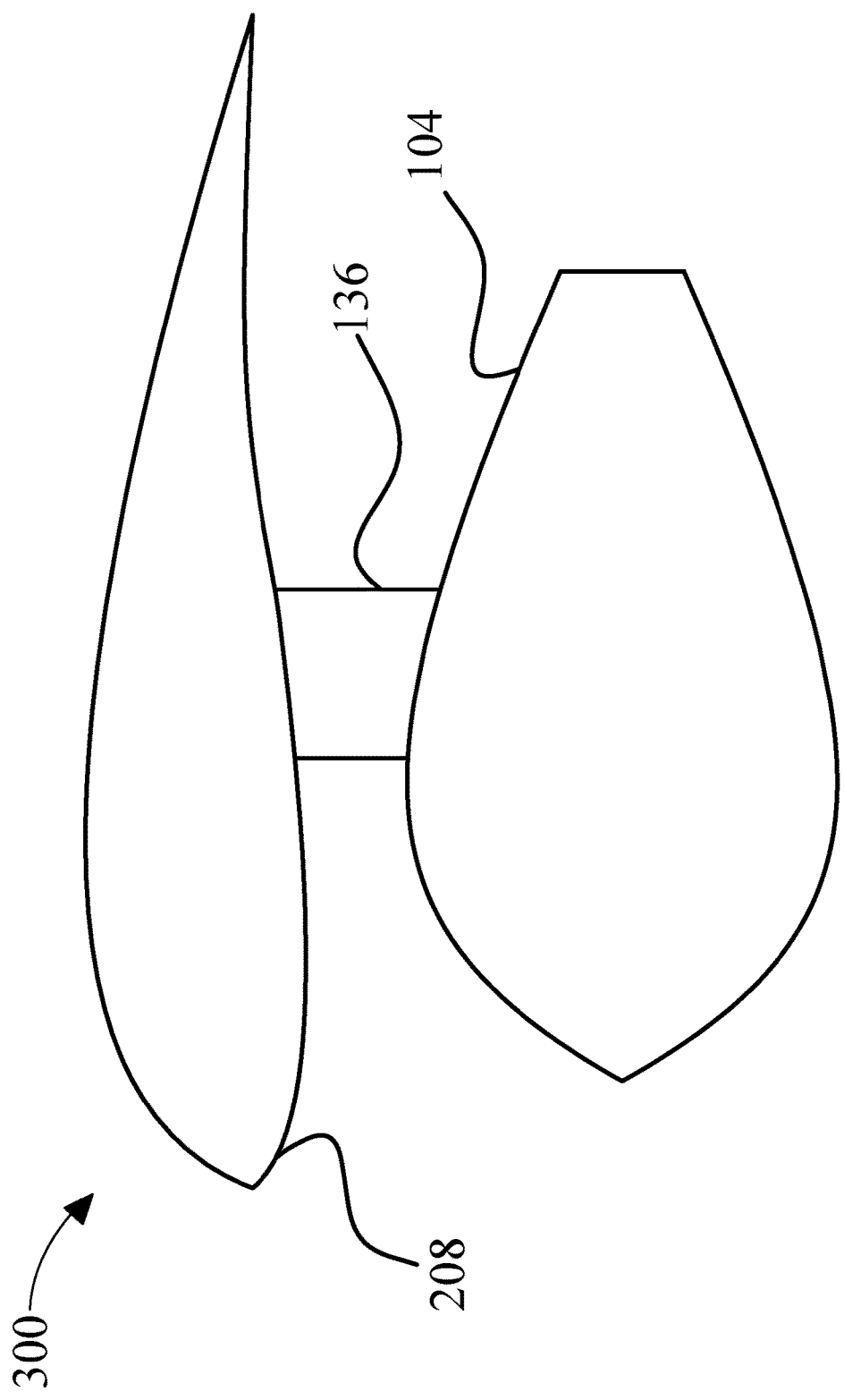
FIG. 3 is a depiction of an exemplary assembly of a laterally extending element and power unit pod system.

Referring now to FIG. 3, an assembly 300 of laterally extending element 204, pod support 136, and power unit pod 104 is shown. In some embodiments, laterally extending element 204 may include a lift generating body. For the purposes of this disclosure, a "lift generating body" is a portion of an object that is contoured so as to produce lift. In some embodiment, the lift generating body may have an airfoil cross section. The airfoil cross section may be consistent with any airfoil cross section discussed as this disclosure. As a non-limiting example, the airfoil cross section may be chosen from the NACA 4-digit series or NACA 5-digit series of airfoils.

With continued reference to FIG. 3, power unit pod 104 is attached to the at least a laterally extending element 208. In some embodiments, power unit pod 104 may be removably attached to the at least a laterally extending element 208. For the purposes of this disclosure, "removably attached" means attached to an object such that it may be removed without damaging the object. In some embodiments, power unit pod 104 may be removably attached to the underside of the at least a laterally extending element 208. As a non-limiting example, power unit pod 104 may be removably attached using bolts, screws, and the like. A person of ordinary skill in the art, after reviewing the entirety of this disclosure, would appreciate that a wide variety of fasteners may be used to removably attach power unit pod 104. In some embodiments, power unit pod may be connected to pod support 136, wherein pod support 136 is removably attached to the underside of the at least a laterally extending element. As a non-limiting example, pod support 136 may be removably attached using bolts, screws, and the like. A person of ordinary skill in the art, after reviewing the entirety of this disclosure, would appreciate that a wide variety of fasteners may be used to removably attach pod support 136. For the sake of explanation, when pod support 136 is connected to power unit pod 104 and pod support is removably attached to laterally extending element 208, then power unit pod 104 is also removably attached to laterally extending element 208.

Figure 4:
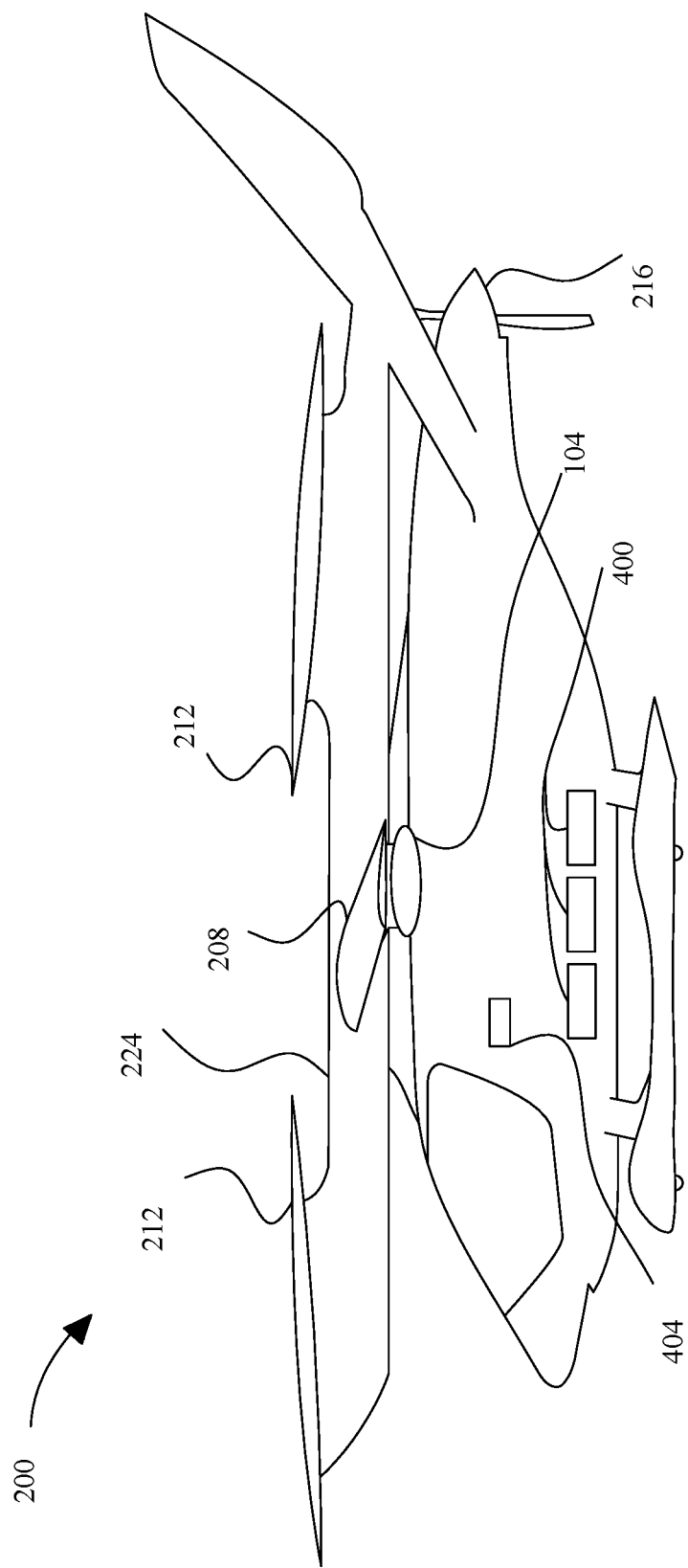
FIG. 4 is a profile view of an exemplary electric aircraft with an exemplary power unit pod system.

Referring now to FIG. 4, another exemplary embodiment of electric aircraft 200 is depicted. In this embodiment, electric aircraft 200 has power unit pod 104 attached. Additionally, electric aircraft 200 includes an energy source 400. In some embodiments, energy source 400 may include multiple energy sources. Energy source 400 may be consistent with any energy source disclosed as part of this disclosure. Energy source 400 is electrically connected to APU 108; as a non-limiting example, using power output line 132. In some embodiments, the electricity generated by APU 108 may be used to recharge energy source 400.

With continued reference to FIG. 4, electric aircraft includes a laterally extending element 208. Electric aircraft 200 may include at least a lift propulsor 212 and a pusher propulsor 216 Each of the at least a lift propulsor 212 and the pusher propulsor 216 may be electrically connected to energy source 400. In some embodiments, each of the at least a lift propulsor 212 and the pusher propulsor 216 may be electrically connected to APU 108. Each of the at least a lift propulsor 212 shown in FIG. 4 may be connected to a second propulsor boom 224. It should be noted, for the sake of clarity, that electric aircraft 200 also may include another pair of lift propulsor 212 attached to a first propulsor boom 224, however, those elements are hidden in FIG. 4.

With continued reference to FIG. 4, in some embodiments, electric aircraft 200 may include a flight controller 404. Flight controller 404 may be communicatively connected to the APU 108. In some embodiments, Flight controller 404 may be communicatively connected to each of the at least a propulsor. In some embodiments, flight controller 404 may be communicatively connected to local controller 128. Flight controller 404 may be consistent with any flight controller 404 disclosed as part of this disclosure. Flight controller 404 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. flight controller 404 may include a single computing device operating independently, or may include two or more computing device operating in concert, in parallel, sequentially or the like; two or more computing devices may be included together in a single computing device or in two or more computing devices. flight controller 404 may interface or communicate with one or more additional devices as described below in further detail via a network interface device. Network interface device may be utilized for connecting flight controller 404 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. flight controller 404 may include but is not limited to, for example, a computing device or cluster of computing devices in a first location and a second computing device or cluster of computing devices in a second location. flight controller 404 may include one or more computing devices dedicated to data storage, security, distribution of traffic for load balancing, and the like. flight controller 404 may distribute one or more computing tasks as described below across a plurality of computing devices of computing device, which may operate in parallel, in series, redundantly, or in any other manner used for distribution of tasks or memory between computing devices. flight controller 404 may be implemented using a "shared nothing" architecture in which data is cached at the worker, in an embodiment, this may enable scalability of system 100 and/or computing device.

With continued reference to FIG. 4, flight controller 404 may be designed and/or configured to perform any method, method step, or sequence of method steps in any embodiment described in this disclosure, in any order and with any degree of repetition. For instance, flight controller 404 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. flight controller 404 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 5:
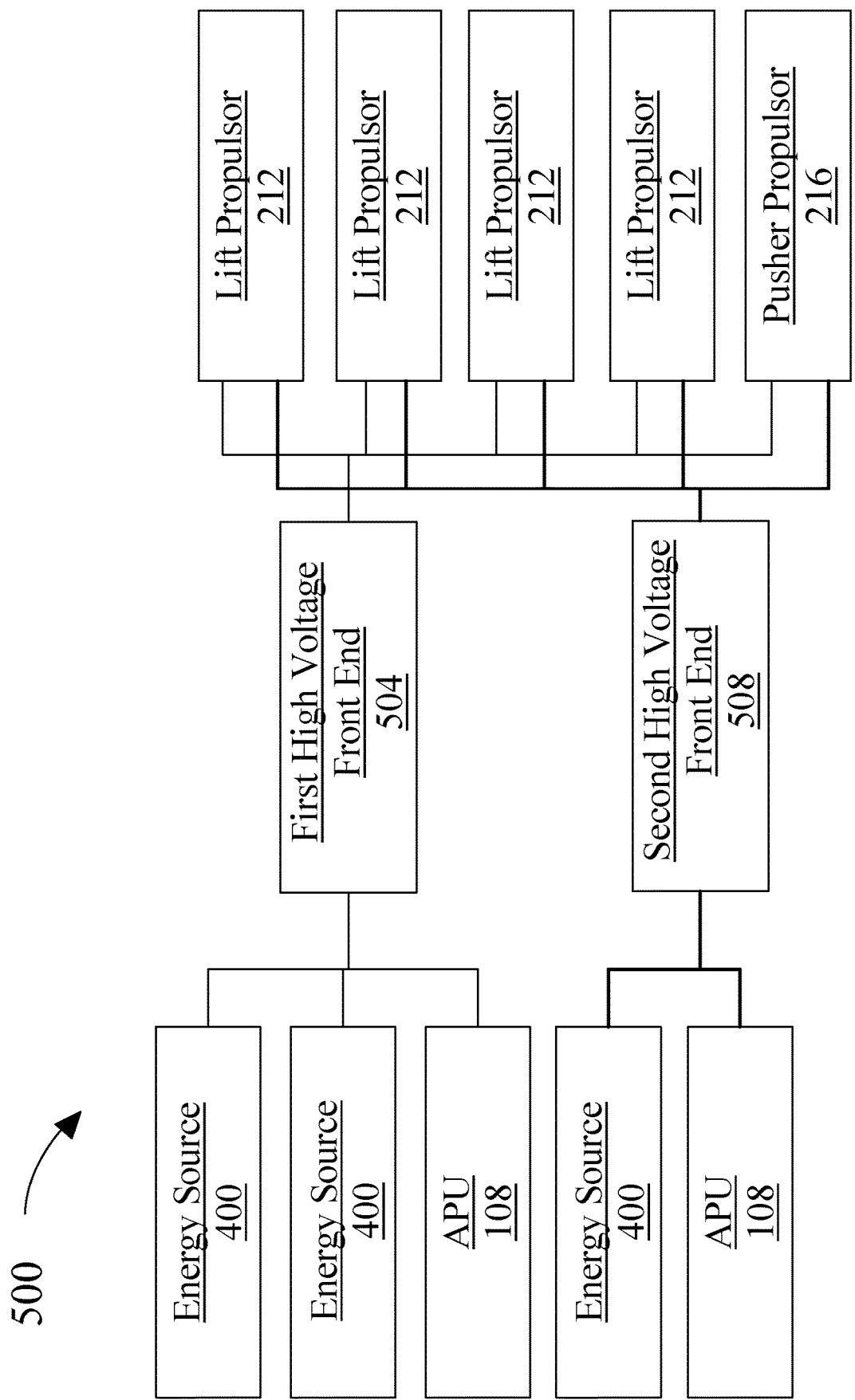
FIG. 5 is a box diagram of an exemplary power distribution system for a hybrid electric aircraft.

Referring now to FIG. 5, a power distribution system 500 is illustrated. Power distribution system 500 may be located on the electric aircraft, such as electric aircraft 200. In some embodiments, system 500 may include a first high voltage front end 504. First high voltage front end 504 may be consistent with any high voltage front end device disclosed in U.S. patent application Ser. No. 17/108,798, filed on Dec. 1, 2020, and titled "SYSTEMS AND METHODS FOR A BATTERY MANAGEMENT SYSTEM INTEGRATED IN A BATTERY PACK CONFIGURED FOR USE IN ELECTRIC AIRCRAFT," the entirety of which is hereby incorporated by reference. For the purposes of this disclosure, a "high voltage front end" is an interface between one or more sources of energy and one or more loads, wherein the interface is configured to handle high voltage power. First high voltage front end 504 may be electrically connected to energy source 400. In some embodiments, first high voltage front end 504 may be electrically connected to each of the at least a propulsor. In some embodiments, first high voltage front end 504 may provide power to each of the at least a propulsor. In some embodiments, first high voltage front end 504 may be electrically connected to power output line 132 of power unit pod 104. First high voltage front end 504 may receive power from the energy sources 400 and power output line 132 of the power unit pod 104 (i.e. it may receive power from APU 108). First high voltage front end 504 may send power to the lift propulsors 212 and pusher propulsor 216. First high voltage front end 504 may send power to energy sources 400.

As depicted in FIG. 5, first high voltage front end 504 may be electrically connected to only a subset of energy sources 400 and APU 108. As depicted in FIG. 5, first high voltage front end 504 may be electrically connected to two of energy source 400. First high voltage front end 504 may be electrically connected to APU 108. First high voltage front end 504 can distribute the power from these components to lift propulsors 212 and pusher propulsor 216.

With continued reference to FIG. 5, in some embodiments, system 500 may include a second high voltage front end 508. Second high voltage front end 508 may be consistent with any high voltage front end device disclosed in U.S. patent application Ser. No. 17/108,798, filed on Dec. 1, 2020, and titled "SYSTEMS AND METHODS FOR A BATTERY MANAGEMENT SYSTEM INTEGRATED IN A BATTERY PACK CONFIGURED FOR USE IN ELECTRIC AIRCRAFT." Second high voltage front end 508 may be electrically connected to energy source 400. In some embodiments, second high voltage front end 508 may be electrically connected to each of the at least a propulsor. In some embodiments, second high voltage front end 508 may provide power to each of the at least a propulsor. In some embodiments, second high voltage front end 508 may be electrically connected to power output line 132 of power unit pod 104. Second high voltage front end 508 may receive power from the energy sources 400 and power output line 132 of the power unit pod 104 (i.e. it may receive power from APU 108). Second high voltage front end 508 may send power to the lift propulsors 212 and pusher propulsor 216. Second high voltage front end 508 may send power to energy sources 400.

As depicted in FIG. 5, second high voltage front end 508 may be electrically connected to only a subset of energy sources 400 and APU 108. As depicted in FIG. 5, second high voltage front end 508 may be electrically connected to two of energy source 400 and not electrically connected to APU 108. Second high voltage front end 508 can distribute the power from these components to lift propulsors 212 and pusher propulsor 216.

With continued reference to FIG. 5, in some embodiments, first high voltage front end 504 and/or second high voltage front end 508 may be communicatively connected to a controller. As a non-limiting example, first high voltage front end 504 and/or second high voltage front end 508 may be communicatively connected to a controller using a Controller Area Network (CAN) bus. A "CAN bus," for the purposes of this disclosure is a specialized internal communications network for a vehicle, configured to allow a controller to communicate with other components in the vehicle without the need for a host computer.

Figure 6:
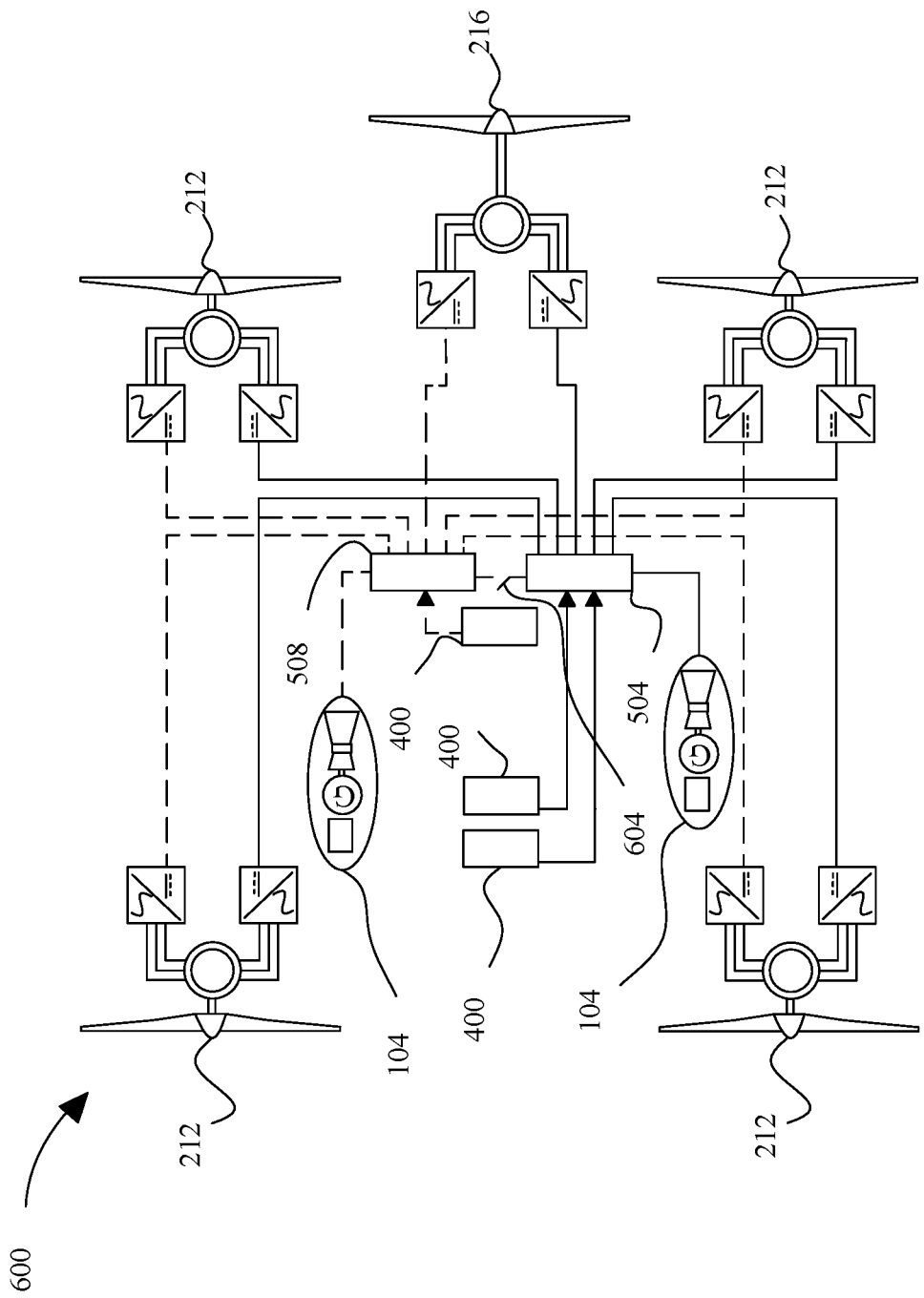
FIG. 6 is a diagram of an exemplary flight controller.

Referring now to FIG. 6, another power distribution system 600 is diagrammed in an exemplary embodiment. System 500 may be consistent with system 600. System 600 includes first high voltage front end 504 and second high voltage front end 508. In some embodiments, first high voltage front end and second high voltage front end may be connected by an interlock component 604. For the purposes of this disclosure, an "interlock component" is a component that ensures that one or more conditions are met before enabling or disabling an electric connection. Interlock component 604 may include any device configured to allow current flow in one state and disallow current flow in another state. As a non-limiting example, interlock component 604 may be a relay. A relay is an electrically and/or electromechanically operated switch that can receive control signals. A relay can be engaged or disengaged by the control signals. A relay need not have any moving parts and can be solid state. As another non-limiting example, interlock component 604 may be a mechanical switch. In its engaged state, interlock component 604 may electrically connect first high voltage front end 504 to second high voltage front end. In its disengaged state, in some embodiments, interlock component 604 does not electrically connect first high voltage front end 504 to second high voltage front end 508. In some embodiments, interlock component 604 may be electrically connected to a computing device, such as a flight controller. In some embodiments, the computing device may engage and/or disengage interlock component 604 by sending electrical signals to interlock component 604.

With continued reference to FIG. 6, the electrical connections going into/out of first high voltage front end 504 are indicated using solid lines. The electrical connections going into/out of second high voltage front end 508 are indicated using dashed lines. First high voltage front end 504 may receive electrical power from an energy source 400. In some embodiments, first high voltage front end 504 may receive electrical power from multiple energy sources 400. First high voltage front end 504 may also receive electrical power from a power unit pod 104. In some embodiments, power unit pod 104 may include a fuel tank 112 and APU 108. First high voltage front end 504 may supply electrical power to any of the at least a propulsor. In some embodiments, first high voltage front end 504 may be electrically connected to each lift propulsor 212. In some embodiments, first high voltage front end 504 may be electrically connected to a pusher propulsor 216.

With continued reference to FIG. 6, Second high voltage front end 508 may receive electrical power from an energy source 400. In some embodiments, second high voltage front end 508 may receive electrical power from multiple energy sources 400. Second high voltage front end 508 may also receive electrical power from a power unit pod 104. In some embodiments, this may be a separate power unit pod 104 then the power unit pod to which first high voltage front end 504 is electrically connected. In some embodiments, power unit pod 104 may include a fuel tank 112 and APU 108. Second high voltage front end 508 may supply electrical power to any of the at least a propulsor. In some embodiments, second high voltage front end 508 may be electrically connected to each lift propulsor 212. In some embodiments, second high voltage front end 508 may be electrically connected to a pusher propulsor 216.

With continued reference to FIG. 6, in some embodiments, each of the propulsors (lift propulsors 212 and pusher propulsor 216) may be each electrically connected to a set of inverters, a first inverter and a second inverter. An "inverter," for the purposes of this disclosure, is a frequency converter that converts DC power into AC power. Specifically, first inverter and/or second inverter may supply AC power to drive the propulsors. First inverter and/or second inverter may be consistent with any inverter disclosed in in U.S. patent application Ser. No. 16/703,225, filed on Dec. 4, 2019, and titled "AN INTEGRATED ELECTRIC PROPULSION ASSEMBLY." First inverter and/or second inverter may be consistent with any inverter disclosed in disclosed in U.S. patent application Ser. No. 16/938,952, filed on Jul. 25, 2020, and titled "AN INTEGRATED ELECTRIC PROPULSION ASSEMBLY," the entirety of which is hereby incorporated by reference. In some embodiments, first high voltage front end 504 may be electrically connected to each of the first inverters which are electrically connected to each of the propulsors, but not electrically connected to each of the second inverters which are electrically connected to each of the propulsors. In these same embodiments, second high voltage front end 508 may be electrically connected to each of the second inverters which are electrically connected to each of the propulsors, but not electrically connected to each of the first inverters which are electrically connected to each of the propulsors.

Figure 7:
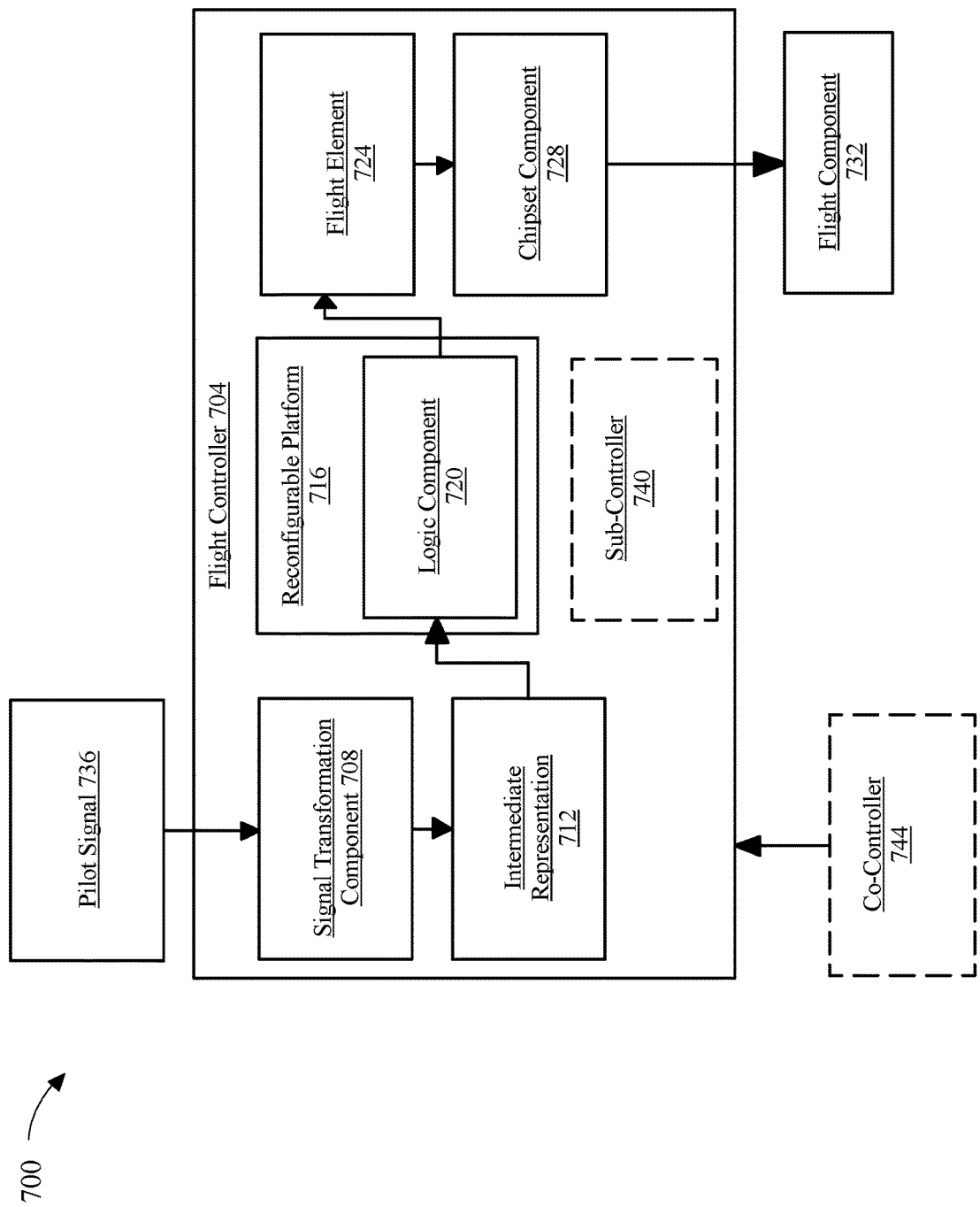
FIG. 7 is a diagram of an exemplary machine learning module.

Now referring to FIG. 7, an exemplary embodiment 700 of a flight controller 704 is illustrated. As used in this disclosure a "flight controller" is a computing device of a plurality of computing devices dedicated to data storage, security, distribution of traffic for load balancing, and flight instruction. Flight controller 704 may include and/or communicate with any computing device as described in this disclosure, including without limitation a microcontroller, microprocessor, digital signal processor (DSP) and/or system on a chip (SoC) as described in this disclosure. Further, flight controller 704 may include a single computing device operating independently, or may include two or more computing device operating in concert, in parallel, sequentially or the like; two or more computing devices may be included together in a single computing device or in two or more computing devices. In embodiments, flight controller 704 may be installed in an aircraft, may control the aircraft remotely, and/or may include an element installed in the aircraft and a remote element in communication therewith.

In an embodiment, and still referring to FIG. 7, flight controller 704 may include a signal transformation component 708. As used in this disclosure a "signal transformation component" is a component that transforms and/or converts a first signal to a second signal, wherein a signal may include one or more digital and/or analog signals. For example, and without limitation, signal transformation component 708 may be configured to perform one or more operations such as preprocessing, lexical analysis, parsing, semantic analysis, and the like thereof. In an embodiment, and without limitation, signal transformation component 708 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 708 may include transforming one or more low-level languages such as, but not limited to, machine languages and/or assembly languages. For example, and without limitation, signal transformation component 708 may include transforming a binary language signal to an assembly language signal. In an embodiment, and without limitation, signal transformation component 708 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 7, signal transformation component 708 may be configured to optimize an intermediate representation 712. As used in this disclosure an "intermediate representation" is a data structure and/or code that represents the input signal. Signal transformation component 708 may optimize intermediate representation as a function of a data-flow analysis, dependence analysis, alias analysis, pointer analysis, escape analysis, and the like thereof. In an embodiment, and without limitation, signal transformation component 708 may optimize intermediate representation 712 as a function of one or more inline expansions, dead code eliminations, constant propagation, loop transformations, and/or automatic parallelization functions. In another embodiment, signal transformation component 708 may optimize intermediate representation as a function of a machine dependent optimization such as a peephole optimization, wherein a peephole optimization may rewrite short sequences of code into more efficient sequences of code. Signal transformation component 708 may optimize intermediate representation to generate an output language, wherein an "output language," as used herein, is the native machine language of flight controller 704. For example, and without limitation, native machine language may include one or more binary and/or numerical languages.

In an embodiment, and without limitation, signal transformation component 708 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 7, flight controller 704 may include a reconfigurable hardware platform 716. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 716 may be reconfigured to enact any algorithm and/or algorithm selection process received from another computing device and/or created using machine-learning processes.

Still referring to FIG. 7, reconfigurable hardware platform 716 may include a logic component 720. As used in this disclosure a "logic component" is a component that executes instructions on output language. For example, and without limitation, logic component may perform basic arithmetic, logic, controlling, input/output operations, and the like thereof. Logic component 720 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 720 may be organized according to Von Neumann and/or Harvard architecture as a non-limiting example. Logic component 720 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 720 may include one or more integrated circuit microprocessors, which may contain one or more central processing units, central processors, and/or main processors, on a single metal-oxide-semiconductor chip. Logic component 720 may be configured to execute a sequence of stored instructions to be performed on the output language and/or intermediate representation 712. Logic component 720 may be configured to fetch and/or retrieve the instruction from a memory cache, wherein a "memory cache," as used in this disclosure, is a stored instruction set on flight controller 704. Logic component 720 may be configured to decode the instruction retrieved from the memory cache to opcodes and/or operands. Logic component 720 may be configured to execute the instruction on intermediate representation 712 and/or output language. For example, and without limitation, logic component 720 may be configured to execute an addition operation on intermediate representation 712 and/or output language.

In an embodiment, and without limitation, logic component 720 may be configured to calculate a flight element 724. As used in this disclosure a "flight element" is an element of datum denoting a relative status of aircraft. For example, and without limitation, flight element 724 may denote one or more torques, thrusts, airspeed velocities, forces, altitudes, groundspeed velocities, directions during flight, directions facing, forces, orientations, and the like thereof. For example, and without limitation, flight element 724 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 724 may denote that aircraft is following a flight path accurately and/or sufficiently.

Still referring to FIG. 7, flight controller 704 may include a chipset component 728. As used in this disclosure a "chipset component" is a component that manages data flow.

In an embodiment, and without limitation, chipset component 728 may include a northbridge data flow path, wherein the northbridge dataflow path may manage data flow from logic component 720 to a high-speed device and/or component, such as a RAM, graphics controller, and the like thereof. In another embodiment, and without limitation, chipset component 728 may include a southbridge data flow path, wherein the southbridge dataflow path may manage data flow from logic component 720 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 728 may manage data flow between logic component 720, memory cache, and a flight component 732. As used in this disclosure a "flight component" is a portion of an aircraft that can be moved or adjusted to affect one or more flight elements. For example, flight component 732 may include a component used to affect the aircrafts' roll and pitch which may comprise one or more ailerons. As a further example, flight component 732 may include a rudder to control yaw of an aircraft. In an embodiment, chipset component 728 may be configured to communicate with a plurality of flight components as a function of flight element 724. For example, and without limitation, chipset component 728 may transmit to an aircraft rotor to reduce torque of a first lift propulsor and increase the forward thrust produced by a pusher component to perform a flight maneuver.

In an embodiment, and still referring to FIG. 7, flight controller 704 may be configured generate an autonomous function. As used in this disclosure an "autonomous function" is a mode and/or function of flight controller 704 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 724. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 704 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 704 will control the ailerons and/or rudders. As used in this disclosure "non-autonomous mode" is a mode that denotes a pilot will control aircraft and/or maneuvers of aircraft in its entirety.

In an embodiment, and still referring to FIG. 7, flight controller 704 may generate autonomous function as a function of an autonomous machine-learning model. As used in this disclosure an "autonomous machine-learning model" is a machine-learning model to produce an autonomous function output given flight element 724 and a pilot signal 736 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 736 may denote that a pilot is controlling and/or maneuvering ailerons, wherein the pilot is not in control of the rudders and/or propulsors. In an embodiment, pilot signal 736 may include an implicit signal and/or an explicit signal. For example, and without limitation, pilot signal 736 may include an explicit signal, wherein the pilot explicitly states there is a lack of control and/or desire for autonomous function. As a further non-limiting example, pilot signal 736 may include an explicit signal directing flight controller 704 to control and/or maintain a portion of aircraft, a portion of the flight plan, the entire aircraft, and/or the entire flight plan. As a further non-limiting example, pilot signal 736 may include an implicit signal, wherein flight controller 704 detects a lack of control such as by a malfunction, torque alteration, flight path deviation, and the like thereof. In an embodiment, and without limitation, pilot signal 736 may include one or more explicit signals to reduce torque, and/or one or more implicit signals that torque may be reduced due to reduction of airspeed velocity. In an embodiment, and without limitation, pilot signal 736 may include one or more local and/or global signals. For example, and without limitation, pilot signal 736 may include a local signal that is transmitted by a pilot and/or crew member. As a further non-limiting example, pilot signal 736 may include a global signal that is transmitted by air traffic control and/or one or more remote users that are in communication with the pilot of aircraft. In an embodiment, pilot signal 736 may be received as a function of a tri-state bus and/or multiplexor that denotes an explicit pilot signal should be transmitted prior to any implicit or global pilot signal.

Still referring to FIG. 7, autonomous machine-learning model may include one or more autonomous machine-learning processes such as supervised, unsupervised, or reinforcement machine-learning processes that flight controller 704 and/or a remote device may or may not use in the generation of autonomous function. As used in this disclosure "remote device" is an external device to flight controller 704. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 7, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 704 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 7, flight controller 704 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 704. Remote device and/or FPGA may transmit a signal, bit, datum, or parameter to flight controller 704 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 704 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 7, flight controller 704 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 7, flight controller 704 may include, but is not limited to, for example, a cluster of flight controllers in a first location and a second flight controller or cluster of flight controllers in a second location. Flight controller 704 may include one or more flight controllers dedicated to data storage, security, distribution of traffic for load balancing, and the like. Flight controller 704 may be configured to distribute one or more computing tasks as described below across a plurality of flight controllers, which may operate in parallel, in series, redundantly, or in any other manner used for distribution of tasks or memory between computing devices. For example, and without limitation, flight controller 704 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 7, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 732. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 7, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 704. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 712 and/or output language from logic component 720, wherein output language may include one or more analog-to-digital conversions, low bit rate transmissions, message encryptions, digital signals, binary signals, logic signals, analog signals, and the like thereof described above in detail.

Still referring to FIG. 7, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 7, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 7, flight controller 704 may also be implemented using a "shared nothing" architecture in which data is cached at the worker, in an embodiment, this may enable scalability of aircraft and/or computing device. Flight controller 704 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 7, flight controller may include a sub-controller 740. As used in this disclosure a "sub-controller" is a controller and/or component that is part of a distributed controller as described above; for instance, flight controller 704 may be and/or include a distributed flight controller made up of one or more sub-controllers. For example, and without limitation, sub-controller 740 may include any controllers and/or components thereof that are similar to distributed flight controller and/or flight controller as described above. Sub-controller 740 may include any component of any flight controller as described above. Sub-controller 740 may be implemented in any manner suitable for implementation of a flight controller as described above. As a further non-limiting example, sub-controller 740 may include one or more processors, logic components and/or computing devices capable of receiving, processing, and/or transmitting data across the distributed flight controller as described above. As a further non-limiting example, sub-controller 740 may include a controller that receives a signal from a first flight controller and/or first distributed flight controller component and transmits the signal to a plurality of additional sub-controllers and/or flight components.

Still referring to FIG. 7, flight controller may include a co-controller 744. As used in this disclosure a "co-controller" is a controller and/or component that joins flight controller 704 as components and/or nodes of a distributer flight controller as described above. For example, and without limitation, co-controller 744 may include one or more controllers and/or components that are similar to flight controller 704. As a further non-limiting example, co-controller 744 may include any controller and/or component that joins flight controller 704 to distributer flight controller. As a further non-limiting example, co-controller 744 may include one or more processors, logic components and/or computing devices capable of receiving, processing, and/or transmitting data to and/or from flight controller 704 to distributed flight control system. Co-controller 744 may include any component of any flight controller as described above. Co-controller 744 may be implemented in any manner suitable for implementation of a flight controller as described above.

In an embodiment, and with continued reference to FIG. 7, flight controller 704 may be designed and/or configured to perform any method, method step, or sequence of method steps in any embodiment described in this disclosure, in any order and with any degree of repetition. For instance, flight controller 704 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 8:
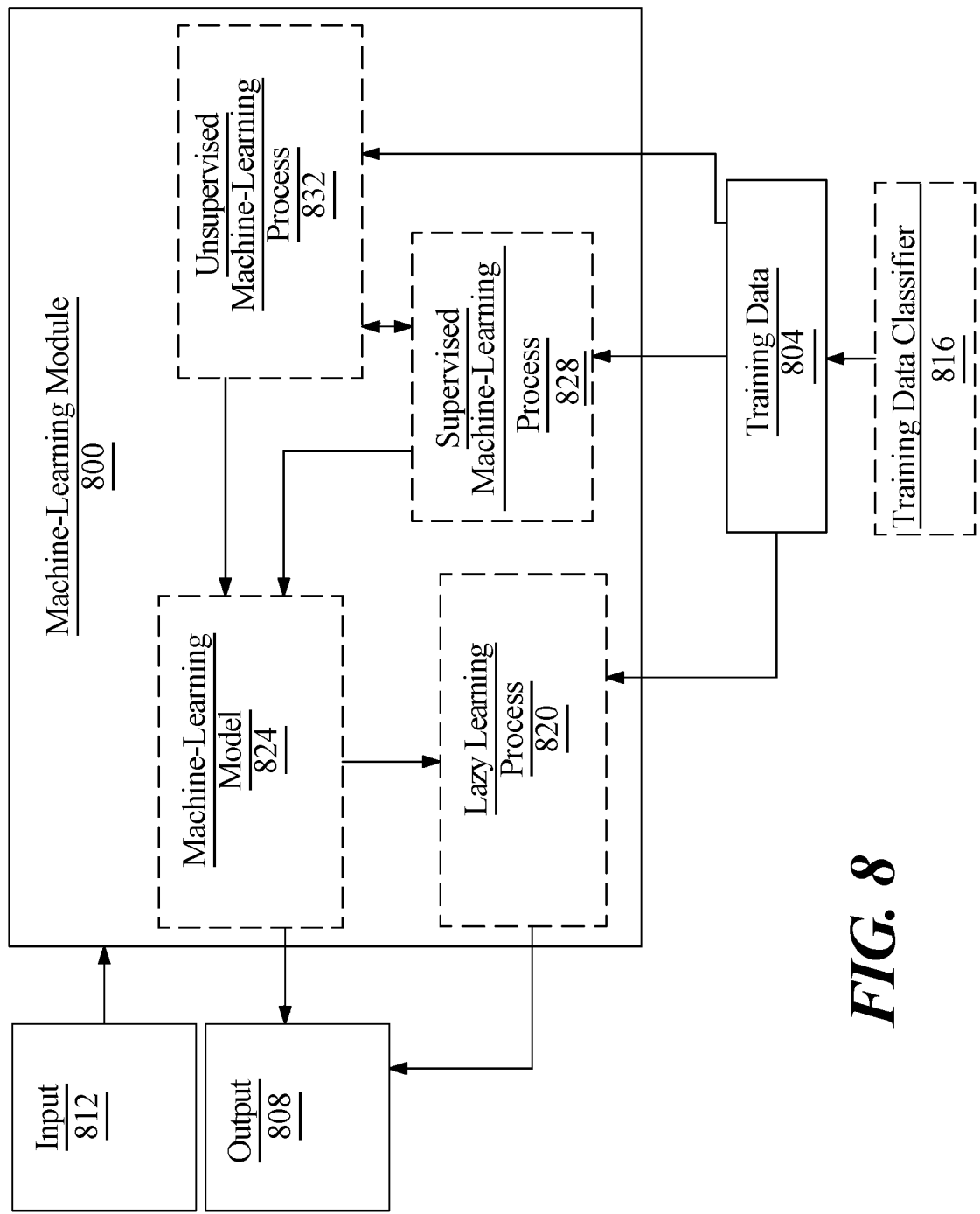
FIG. 8 is a block diagram of a computing system that can be used to implement any one or more of the methodologies disclosed herein and any one or more portions thereof.

Referring now to FIG. 8, an exemplary embodiment of a machine-learning module 800 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 804 to generate an algorithm that will be performed by a computing device/module to produce outputs 808 given data provided as inputs 812; this is in contrast to a non-machine learning software program where the commands to be executed are determined in advance by a user and written in a programming language.

Still referring to FIG. 8, "training data," as used herein, is data containing correlations that a machine-learning process may use to model relationships between two or more categories of data elements. For instance, and without limitation, training data 804 may include a plurality of data entries, each entry representing a set of data elements that were recorded, received, and/or generated together; data elements may be correlated by shared existence in a given data entry, by proximity in a given data entry, or the like. Multiple data entries in training data 804 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 804 according to various correlations; correlations may indicate causative and/or predictive links between categories of data elements, which may be modeled as relationships such as mathematical relationships by machine-learning processes as described in further detail below. Training data 804 may be formatted and/or organized by categories of data elements, for instance by associating data elements with one or more descriptors corresponding to categories of data elements. As a non-limiting example, training data 804 may include data entered in standardized forms by persons or processes, such that entry of a given data element in a given field in a form may be mapped to one or more descriptors of categories. Elements in training data 804 may be linked to descriptors of categories by tags, tokens, or other data elements; for instance, and without limitation, training data 804 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 8, training data 804 may include one or more elements that are not categorized; that is, training data 804 may not be formatted or contain descriptors for some elements of data. Machine-learning algorithms and/or other processes may sort training data 804 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 804 to be made applicable for two or more distinct machine-learning algorithms as described in further detail below. Training data 804 used by machine-learning module 800 may correlate any input data as described in this disclosure to any output data as described in this disclosure. As a non-limiting illustrative example flight elements and/or pilot signals may be inputs, wherein an output may be an autonomous function.

Further referring to FIG. 8, training data may be filtered, sorted, and/or selected using one or more supervised and/or unsupervised machine-learning processes and/or models as described in further detail below; such models may include without limitation a training data classifier 816. Training data classifier 816 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 800 may generate a classifier using a classification algorithm, defined as a processes whereby a computing device and/or any module and/or component operating thereon derives a classifier from training data 804. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 8, machine-learning module 800 may be configured to perform a lazy-learning process 820 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 804. Heuristic may include selecting some number of highest-ranking associations and/or training data 804 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 8, machine-learning processes as described in this disclosure may be used to generate machine-learning models 824. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 824 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 824 may be generated by creating an artificial neural network, such as a convolutional neural network comprising an input layer of nodes, one or more intermediate layers, and an output layer of nodes. Connections between nodes may be created via the process of "training" the network, in which elements from a training data 804 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, machine-learning algorithms may include at least a supervised machine-learning process 828. At least a supervised machine-learning process 828, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss"

of an algorithm relating inputs to outputs, where loss is computed as an error function representing a degree to which a prediction generated by the relation is incorrect when compared to a given input-output pair provided in training data 804. Persons skilled in the art, upon reviewing the entirety of this disclosure, will be aware of various possible variations of at least a supervised machine-learning process 828 that may be used to determine relation between inputs and outputs. Supervised machine-learning processes may include classification algorithms as defined above.

Further referring to FIG. 8, machine learning processes may include at least an unsupervised machine-learning processes 832. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 8, machine-learning module 800 may be designed and configured to create a machine-learning model 824 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 8, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
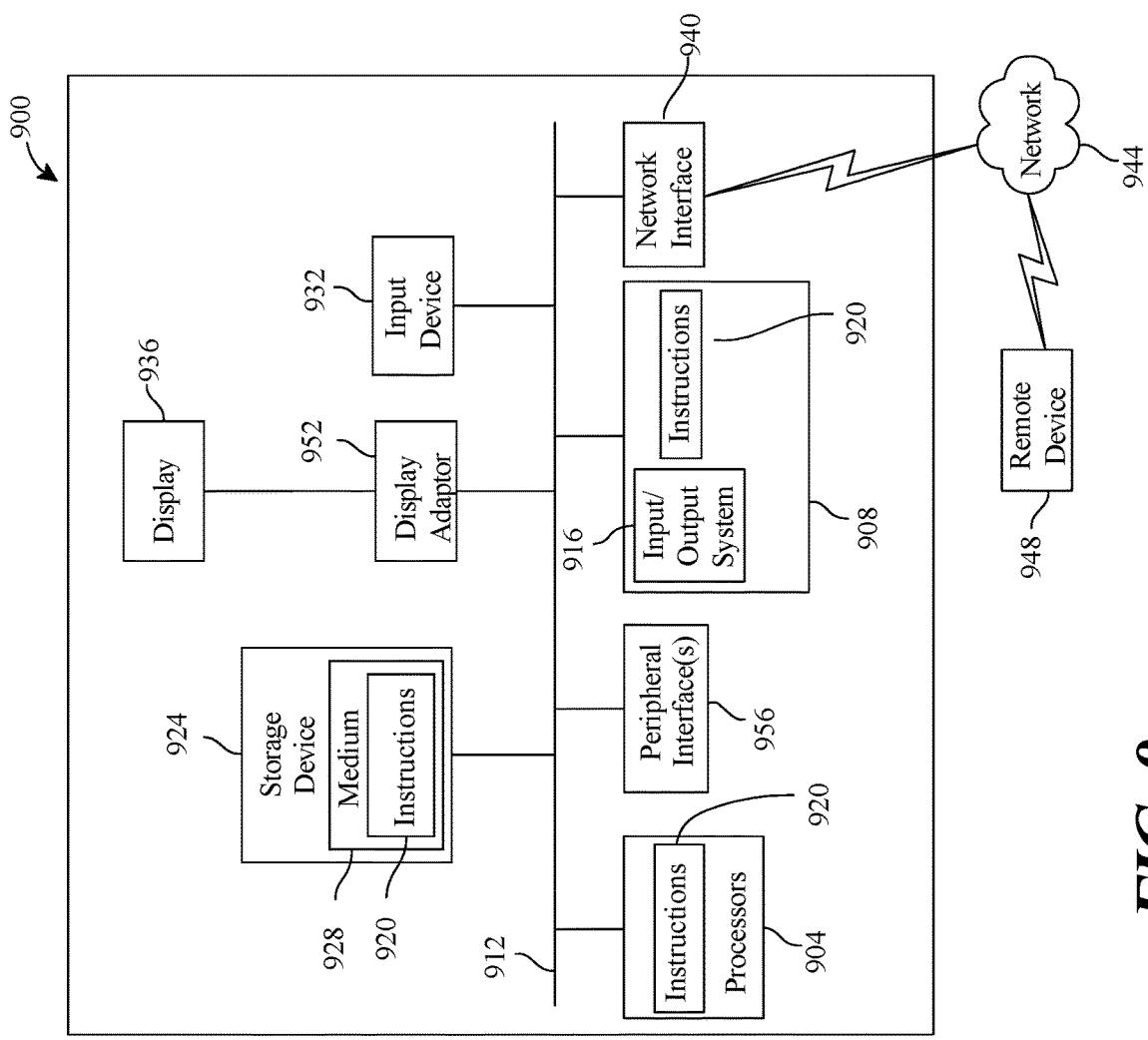
FIG. 9 shows a diagrammatic representation of one embodiment of a computing device in the exemplary form of a computer system The drawings are not necessarily to scale and may be illustrated by phantom lines, diagrammatic representations and fragmentary views. In certain instances, details that are not necessary for an understanding of the embodiments or that render other details difficult to perceive may have been omitted.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956.

Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A hybrid propulsion system for an electric aircraft, the system comprising:
    an electric aircraft, the electric aircraft comprising:
        a fuselage, the fuselage comprising an energy source, wherein the energy source is configured to store electric power;
        at least laterally extending element, wherein:
            the at least laterally extending element is attached to the fuselage; and
            the at least laterally extending element extends laterally from the fuselage; and
        at least a propulsor, wherein the at least propulsor is electrically connected to the energy source; and
    at least a power unit pod, wherein the at least power unit pod is attached to the at least laterally extending element, the at least power unit pod comprising:
        an auxiliary power unit, the auxiliary power unit configured to generate electric power;
        a fuel tank, wherein the fuel tank is in fluid communication with the auxiliary power unit and includes a fuel pump for transferring fuel from the fuel tank to the auxiliary power unit;
        a local controller communicatively connected to the auxiliary power unit, the fuel tank and a flight controller onboard the electric aircraft, wherein the local controller is configured to:
            transmit a control signal to at least the fuel pump of the fuel tank to control operation of the fuel pump;
        a power supply electrically connected to the auxiliary power unit, the local controller and the fuel tank, wherein the power supply is configured to convert source power from the auxiliary power unit to load power and provide the load power to the local controller and the fuel tank including the fuel pump; and
        a power output line, the power output line electrically connected to the energy source of the electric aircraft for recharging the energy source.

2. The system of claim 1, wherein the at least power unit pod further comprises a predetermined voltage power line, the predetermined voltage power line electrically connected to the auxiliary power unit.

3. The system of claim 1, wherein the at least propulsor further comprises:
    at least a pusher propulsor, wherein the at least pusher propulsor is configured to provide forward thrust to the electric aircraft; and
    at least a lift propulsor, wherein the at least lift propulsor is configured to provide lift to the electric aircraft.

4. The system of claim 1, wherein the at least power unit pod is removably attached to an underside of the at least laterally extending element.

5. The system of claim 4, wherein the at least power unit pod is connected to a pod support, wherein the pod support is removably attached to the underside of the at least laterally extending element.

6. The system of claim 5, wherein the pod support has an airfoil cross section.

7. The system of claim 1, wherein the at least laterally extending element comprises a lift generating body, wherein the lift generating body has an airfoil cross section.

8. The system of claim 1, wherein the electric aircraft further comprises a first predetermined voltage interface, wherein the first predetermined voltage interface is electrically connected to:
    the energy source;
    each of the at least propulsor; and
    the power output line of the at least power unit pod.

9. The system of claim 8, wherein the first predetermined voltage interface is configured to:
    receive a first predetermined voltage power from the energy source and the power output line of the at least power unit pod; and
    provide power to each of the at least propulsor.

10. The system of claim 3, wherein:
    the at least lift propulsor comprises two lift propulsors; and
    each of the two lift propulsors are connected to the at least laterally extending element.

11. The system of claim 3, wherein the electric aircraft further comprises:
    a first propulsor boom connected to the at least laterally extending element; and
    a second propulsor boom connected to the at least laterally extending element.

12. The system of claim 11, wherein:
    a first lift propulsor of the at least lift propulsor is connected to the first propulsor boom; and
    a second lift propulsor of the at least lift propulsor is connected to the second propulsor boom.

13. The system of claim 11, wherein:
    a first set of lift propulsors of the at least lift propulsor is connected to the first propulsor boom; and
    a second set of lift propulsors of the at least lift propulsor is connected to the second propulsor boom.

14. The system of claim 3, wherein the at least pusher propulsor is connected to a tail end of the electric aircraft.

15. The system of claim 1, wherein the at least power unit pod is contained within a nacelle, wherein the nacelle is shaped to reduce drag when in edgewise flight.

16. The system of claim 1, wherein the electric aircraft comprises a flight controller.

17. The system of claim 16, wherein the flight controller is communicatively connected to the auxiliary power unit of the at least power unit pod.

18. The system of claim 1, wherein the auxiliary power unit of the at least power unit pod has a power rating of over 100 kW.

19. The system of claim 1, wherein the auxiliary power unit of the at least power unit has a 150-200 kW power rating.

20. The system of claim 9, wherein the electric aircraft further comprises a second predetermined voltage interface, wherein:
- the second predetermined voltage interface is electrically connected to:
  - the energy source;
  - each of the at least propulsor; and
  - the power output line of the power unit pod; and
- the second predetermined voltage interface is configured to:
  - receive a second predetermined voltage power from the energy source and the power output line of the at least power unit pod; and
  - provide power to each of the at least propulsor.

* * * * *